United States Patent
Hwang

(10) Patent No.: US 6,876,406 B2
(45) Date of Patent: Apr. 5, 2005

(54) STRUCTURE FOR PREVENTING DISCONNECTION IN LIQUID CRYSTAL DISPLAY DEVICE AND MANUFACTURING METHOD THEREOF

(75) Inventor: Kwang Jo Hwang, Kyonggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 5 days.

(21) Appl. No.: 10/422,812

(22) Filed: Apr. 25, 2003

(65) Prior Publication Data

US 2004/0041956 A1 Mar. 4, 2004

(30) Foreign Application Priority Data

Aug. 28, 2002 (KR) .................. 10-2002-0051184

(51) Int. Cl.⁷ .......................................... G02F 1/1343
(52) U.S. Cl. ....................................................... 349/47
(58) Field of Search ................................ 349/122, 138, 349/47

(56) References Cited

U.S. PATENT DOCUMENTS

| | | | | |
|---|---|---|---|---|
| 4,468,855 A | * | 9/1984 | Sasaki | 438/301 |
| 5,414,278 A | | 5/1995 | Kobayashi et al. | 257/72 |
| 5,545,571 A | * | 8/1996 | Yamazaki et al. | 438/151 |
| 5,747,355 A | * | 5/1998 | Konuma et al. | 438/163 |
| 5,771,110 A | * | 6/1998 | Hirano et al. | 257/72 |
| 6,617,648 B1 | * | 9/2003 | Yamazaki et al. | 257/350 |

* cited by examiner

Primary Examiner—Kenneth Parker
(74) Attorney, Agent, or Firm—Morgan Lewis & Bockius LLP

(57) ABSTRACT

A method for manufacturing an LCD device having gate and data lines includes forming an active layer on an insulating substrate; forming a gate insulating layer over a surface of the insulating substrate including the active layer; forming a gate line and a gate electrode on the gate insulating layer, so that the gate electrode is positioned above the active layer; forming a photoresist pattern on the gate electrode and on the gate line where the gate and the data lines cross each other, wherein, the photoresist pattern surrounds the gate electrode and the gate line; forming source and drain regions in the active layer by injecting impurity ions into the active layer using the photoresist pattern as a mask; removing the photoresist pattern; forming an insulating interlayer over the entire surface of the insulating substrate, the insulating interlayer having first contact holes exposing predetermined portions of the source and drain regions; forming a data line electrically connected to the source region and crossing over the gate line on the insulating interlayer; forming a drain electrode; forming a passivation layer over the surface of the insulating substrate, the passivation layer having a second contact hole exposing a predetermined portion of the drain electrode; and forming a pixel electrode to electrically connect to the drain region through the second contact hole.

23 Claims, 12 Drawing Sheets

STRUCTURE FOR PREVENTING DISCONNECTION IN LIQUID CRYSTAL DISPLAY DEVICE AND MANUFACTURING METHOD THEREOF

This application claims the benefit of the Korean Application No. P2002-51184 filed on Aug. 28, 2002, which is hereby incorporated by reference in its entirety.

BACKGROUND OF THE INVENTION

1. Field of the Invention

The present invention relates to a method for manufacturing a liquid crystal display (LCD) device, and more particularly, to a structure and method for manufacturing an LCD device to prevent a disconnection of a data line.

2. Discussion of the Related Art

As the information society develops demands for various types of display devices increase. Accordingly, many efforts have been made to research and develop various flat display devices, such as liquid crystal displays (LCD), plasma display panels (PDP), electroluminescent displays (ELD), and vacuum fluorescent displays (VFD), and some species of the flat display devices are already applied to displays of various types of equipment. Among the species of flat display devices, the liquid crystal display (LCD) device has been most widely used due to advantageous characteristics, such as thin profile lightweight and low power consumption, as a substitute for the Cathode Ray Tube (CRT). In addition to the mobile type LCD devices, such as a display for a notebook computer, LCD devices have been developed for computer monitors and televisions to display broadcasting signals.

Despite various technical developments in the LCD technology for applications in different fields, research for enhancing the picture quality of the LCD device has been in some respects lacking as compared to other features of the LCD device. To use the LCD device in various fields as a general display, the key lies in whether the LCD device can implement a high quality picture with high resolution and high luminance in a large-sized screen while still maintaining light weight, thin profile and low power consumption.

The LCD device includes an LCD panel for displaying an image and a driving part for applying a driving signal to the LCD panel. The LCD panel includes first and second glass substrates bonded to each other with a gap therebetween, and a liquid crystal layer injected between the first and second glass substrates. On the first glass substrate, otherwise known as a TFT substrate, there are a plurality of gate lines arranged in a first direction at fixed intervals, a plurality of data lines arranged in a second direction perpendicular to the gate lines at fixed intervals, a plurality of pixel electrodes in respective pixel regions defined by the gate and the data lines in a matrix and a plurality of thin film transistors (TFTs) switchable in response to a signal on the gate line for transmission of a signal on the data line to each pixel electrode. On the second glass substrate, otherwise known as a color filter substrate, there are a black matrix layer for preventing light leakage from regions except for the pixel regions, R/G/B color filter layers for displaying colors, and a common electrode for implementing an image. In case of an in-plane switching mode LCD device, the common electrode is formed on the first substrate.

The first and second glass substrates have a predetermined gap formed therebetween by spacers. The first and second glass substrates are bonded to each other by a sealant. The sealant has a liquid crystal injection inlet for injecting liquid crystal. While the space between the bonded first and second substrates is maintained in a vacuum state, the liquid crystal injection hole is positioned into a liquid crystal container such that the liquid crystal is injected between the first and second substrates by osmotic action. Then, when the liquid crystal is completely injected between the first and second substrates, the liquid crystal injection hole is sealed.

In the related art LCD device, an amorphous silicon (a-Si) thin film transistor (TFT) is generally used. However, TFTs formed of a polycrystalline silicon having a high mobility can be integrated into the LCD device such that polycrystalline silicon TFTs are substituted for amorphous silicon TFTs. In addition, the polycrystalline silicon TFTs can be formed as a complementary (CMOS) TFTs when used in driving circuits.

A polycrystalline silicon TFT is greatly affected by hot carrier stress (HCS) and high drain current stress (HDCS) since a polycrystalline silicon TFT has high electron mobility as compared with a amorphous silicon TFT. As channel length becomes shorter, the polycrystalline silicon TFT is more greatly affected by HCS and HDCS, thereby degrading reliability of the polycrystalline silicon TFT. The polycrystalline silicon TFT is manufactured at a temperature similar to that of the amorphous silicon TFT and then developed by crystallization technology using a laser such that polycrystalline silicon TFT is applied to a large-sized glass substrate.

The polycrystalline silicon TFTs can be used in the TFTs of the driving circuits and TFTs of the pixels that are both formed on a glass substrate. The polycrystalline silicon TFTs in the driving circuits can be switched at a high frequencies due to the high electron mobility characteristic of the polycrystalline silicon. However, the polycrystalline silicon TFTs for the pixels have a high drain current value during the switch-off state, thereby generating problems in operating polycrystalline silicon TFT as a switching device for a pixel. To decrease the current during the switch-off state in the polycrystalline silicon TFTs of the pixels, the polycrystalline silicon TFTs of the pixels are formed having a lightly doped drain (LDD) structure, an offset structure, and/or a dual gate structure.

FIG. 1 is a plan view illustrating a pixel of a related art LCD device. As shown in FIG. 1, a plurality of gate lines 11 are formed in one direction on a lower substrate 10 at fixed intervals and a plurality of data lines 12 are formed perpendicular to the gate lines 11, thereby forming a plurality of pixel regions P on the lower substrate 10. A pixel electrode 16 is formed in each pixel region P defined by the plurality of gate and data lines 11 and 12. A thin film transistor T is formed in each pixel region P. The thin film transistor T is switched according to a signal from the gate line 11 such that a signal of the data line 12 is transmitted to the pixel electrode 16.

The thin film transistor T includes a gate electrode 13 protruding from the gate line 11, a gate insulating layer (not shown) formed on the gate electrode 13 and an entire surface of the lower substrate 10, a semiconductor layer 14 on the gate insulating layer (not shown) above the gate electrode 13, a source electrode 15a protruding from the data line 12, and a drain electrode 15b facing the source electrode 15a. The drain electrode 15b is electrically connected to the pixel electrode 16 through a contact hole 17.

The lower substrate 10 having the aforementioned structure is bonded to an upper substrate (not shown) with a predetermined gap therebetween. The upper substrate includes a black matrix layer defining an opening corresponding to the pixel region P of the lower substrate 10 and for preventing light from leaking from regions except the pixel regions. Red R, Green G, or Blue B color filter layers are provided in the opening for displaying colors. A common electrode for driving a liquid crystal with the pixel electrode (reflecting electrode) 16 is provided on the color filter layers R, G and B. The predetermined gap between the upper and lower substrates is determined by spacers. The first and second glass substrates are bonded to each other by a sealant. The sealant has a liquid crystal injection inlet through which the liquid crystal is injected.

A method for manufacturing the related art LCD device will be explained in reference to FIGS. 2A and 2I. More particularly, FIG. 2A to FIG. 2I are cross-sectional views illustrating manufacturing process steps of the related art LCD device shown in FIG. 1. As shown in FIG. 2A, a buffer layer 22 of a silicon oxide material is formed on an insulating substrate (TFT array substrate) 21, and then an amorphous silicon layer is formed on the buffer layer 22. Subsequently, energy, such as laser, is applied to the amorphous silicon layer, thereby forming a polycrystalline silicon layer. The polycrystalline silicon layer is selectively removed by photolithography such that active layer (semiconductor layer) 23 is formed. Then, as shown in FIG. 2B, a metal layer having a low resistance is deposited on the gate insulating layer 24, and then selectively removed by photolithography, so that a plurality of gate lines 25 with protruding gate electrodes 26 are formed at fixed intervals in one direction. For example, the metal layer having the low resistance is formed by sputtering a conductive metal material, such as an aluminum alloy AlNd, chrome Cr, tungsten W, or molybdenum Mo.

As shown in FIG. 2C, n-type impurity ions or p-type impurity ions, depending on the conductivity type of the TFT, are selectively doped into the active layer 23 on the insulating substrate 21 by using the gate electrode 26 as a mask such that LDD regions 27 are formed in the active layer 23 on both sides of the gate electrode 26. Then, as shown in FIG. 2D, a photoresist layer 28 is deposited over the entire surface of the insulating substrate 21, and then selectively patterned by photolithography to be formed surrounding the gate electrode 26. Subsequently, highly doped p-type or n-type impurity ions are selectively doped into the active layer 23 in FIG. 2C by using the patterned photoresist layer 28 as a mask, thereby forming source and drain regions 29 in the active layer 23.

As shown in FIG. 2E, when using $PH_3+H_2$ for doping impurity ions to form the source and drain regions 29, the photoresist 28 changes characteristics in that a portion of it becomes harder. Accordingly, a $CF_4+O_2$ plasma process is needed to etch the hardened portion of the photoresist. However, during the plasma process for etching the hardened portion of the photoresist, a portion of the surface of the gate insulating layer 24 is removed from under the gate line 25. The rest of the photoresist layer 28 is completely removed by a subsequent stripping process. In other words, due to the $CF_4+O_2$ plasma process, a predetermined thickness A of the gate insulating layer 24 is removed.

Referring to FIG. 2F, an insulating interlayer 30 is formed over the entire surface of the insulating substrate 21 including the gate electrode 26. The insulating interlayer 30 and the gate insulating layer 24 are then selectively removed to expose upper surfaces of the source and drain regions 29, thereby forming first contact holes 31. As shown in FIG. 2G, a metal layer is deposited over the entire surface of the insulating substrate 21 including the first contact holes 31. Source and drain electrodes 32a and 32b are formed by etching the metal layer using photolithography. The source electrode 32a is also a data line.

As shown in FIG. 2H, a passivation layer 33 is formed over the entire surface of the insulating substrate 21 including the source and drain electrode 32a and 32b, and then selectively removed to expose a predetermined portion of the drain electrode 32b, thereby forming a second contact hole 34 in FIG. 2H.

Referring to FIG. 2I, a metal layer is then deposited over the entire surface of the insulating substrate 21 including the second contact hole 34, and then selectively patterned to form a pixel electrode 35 connected to the drain electrode 32b through the second contact hole 34. Although not shown, a color filter substrate having a color filter layer and a common electrode is formed facing the TFT array substrate. Then, the color filter substrate and the TFT array substrate are bonded to each other, and a liquid crystal is injected between the color filter substrate and the TFT array substrate.

FIG. 3 is a plan view illustrating a data line perpendicular to a gate line according to manufacturing process steps according to the related art. FIG. 4 is a cross-sectional view illustrating a related art LCD device taken along line II–II' of FIG. 3. As shown in FIG. 3 and FIG. 4, the gate insulating layer 24 below the gate line 25 crossing under the data line 32 is overetched, as shown by "C" in FIG. 4, when removing the photoresist layer 28 shown in FIG. 2E. A disconnection, shown as a dotted line in FIG. 3, occurs due to a failure of step coverage in the insulating interlayer 30 when forming the data line 32.

The related art method for manufacturing the LCD device has disadvantages. For example, the gate insulating layer is partially etched at a predetermined portion adjacent to the gate line when removing the photoresist layer because of a change in the surface of the photoresist layer during the doping of impurity ions into the source and drain regions. In the case of forming CMOS transistors, a process of depositing and removing the photoresist layer is repetitively performed such that the depth of the gate insulating layer, which is etched, is further increased. Accordingly, if the insulating interlayer is deposited on the gate insulating layer when the gate insulating layer is overetched, the disconnection of the data line generates due to the insulating interlayer having poor step coverage.

SUMMARY OF THE INVENTION

Accordingly, the present invention is directed to a method for manufacturing an LCD device that substantially obviates one or more problems due to limitations and disadvantages of the related art.

An object of the present invention is to provide to a method for manufacturing an LCD device preventing a disconnection at a crossing point of gate and data lines to improve yield.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for manufacturing an LCD device having gate and data lines includes forming an active layer on an insulating substrate; forming a gate insulating layer over a surface of the insulating substrate including the active layer; forming a gate line and a gate electrode on the gate insulating layer, so that the gate electrode is positioned above the active layer; forming a photoresist pattern on the gate electrode and on the gate line where the gate and the data lines cross each other, wherein, the photoresist pattern surrounds the gate electrode and the gate line; forming source and drain regions in the active layer by injecting impurity ions into the active layer using the photoresist pattern as a mask; removing the photoresist pattern; forming an insulating interlayer over the entire surface of the insulating substrate, the insulating interlayer having first contact holes exposing predetermined portions of the source and drain regions; forming a data line electrically connected to the source region and crossing over the gate line on the insulating interlayer; forming a drain electrode; forming a passivation layer over the surface of the insulating substrate, the passivation layer having a second contact hole exposing a predetermined portion of the drain electrode; and forming a pixel electrode to electrically connect to the drain region through the second contact hole.

In another aspect, a method for manufacturing an LCD device includes forming an active layer on an insulating layer; forming a gate insulating layer over a surface of the insulating substrate including the active layer; forming a gate line and a gate electrode on the gate insulating layer so that the gate electrode is positioned above the active layer; forming sidewall spacers at both sides of the gate electrode and the gate line; forming source and drain regions in the active layer by injecting impurity ions into the active layer using the gate electrode as a mask; forming an insulating interlayer over the surface of the insulating substrate, wherein the insulating interlayer has first contact holes exposing predetermined portions of the source and drain regions; forming a data line electrically connected to the source region and crossing over the gate line on the insulating interlayer; forming a drain electrode; forming a passivation layer over the surface of the insulating substrate, wherein the passivation layer has a second contact hole exposing a predetermined portion of the drain electrode; and forming a pixel electrode to electrically connect to the drain electrode through the second contact hole.

In another aspect, an LCD device includes an active layer on an insulating layer; a gate insulating layer formed over a surface of the insulating substrate including the active layer; a gate line and a gate electrode formed on the gate insulating layer so that the gate electrode is positioned above the active layer; sidewall spacers formed at both sides of the gate electrode and the gate line; source and drain regions formed in the active layer by injecting impurity ions into the active layer using the gate electrode and the sidewall spacers as a mask; an insulating interlayer formed over the surface of the insulating substrate, wherein the insulating interlayer has first contact holes exposing predetermined portions of the source and drain regions; drain electrode connected to the drain region; a data line connected to the source region and crossing directly over a portion of the gate line along a pixel area boundary in which the portion of the gate line has the sidewall spacers; a passivation layer formed over the surface of the insulating substrate, wherein the passivation layer has a second contact hole exposing a predetermined portion of the drain electrode; and a pixel electrode electrically contacting the drain electrode through the second contact hole.

In another aspect, an LCD device includes: an active layer on an insulating layer; a gate insulating layer formed over a surface of the insulating substrate including the active layer; a gate line and a gate electrode formed on the gate insulating layer so that the gate electrode is positioned above the active layer; source and drain regions formed in the active layer by injecting impurity ions into the active layer using the gate electrode and the sidewall spacers as a mask; an insulating interlayer formed over the surface of the insulating substrate, wherein the insulating interlayer has first contact holes exposing predetermined portions of the source and drain regions; drain electrode connected to the drain region; a data line connected to the source region and crossing directly over a portion of the gate line along a pixel area boundary in which the portion of the gate line is on plateau of the gate insulating layer; a passivation layer formed over the surface of the insulating substrate, wherein the passivation layer has a second contact hole exposing a predetermined portion of the drain electrode; and a pixel electrode electrically contacting the drain electrode through the second contact hole.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 7 is a cross-sectional view illustrating an LCD device taken along line IV–IV' of.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
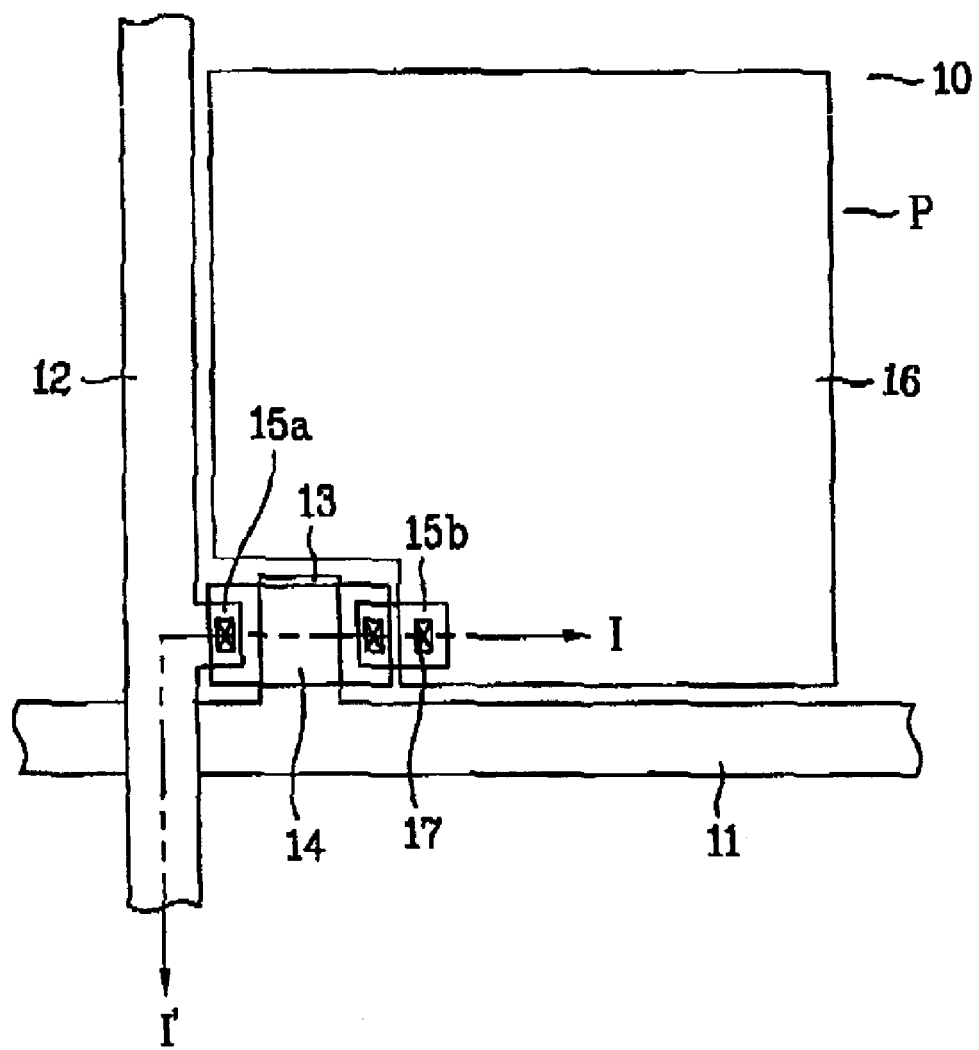
FIG. 1 is a plan view illustrating a related art LCD device.
Figure 2A:
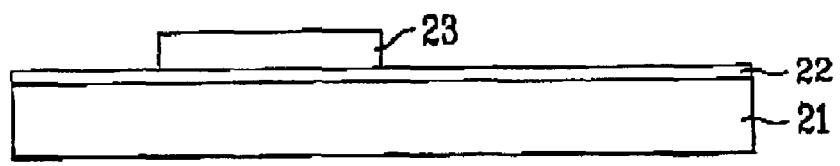
FIG. 2A to FIG. 2I are cross-sectional views illustrating manufacturing process steps of a related art LCD device taken along line I–I' of FIG. 1.
Figure 2B:
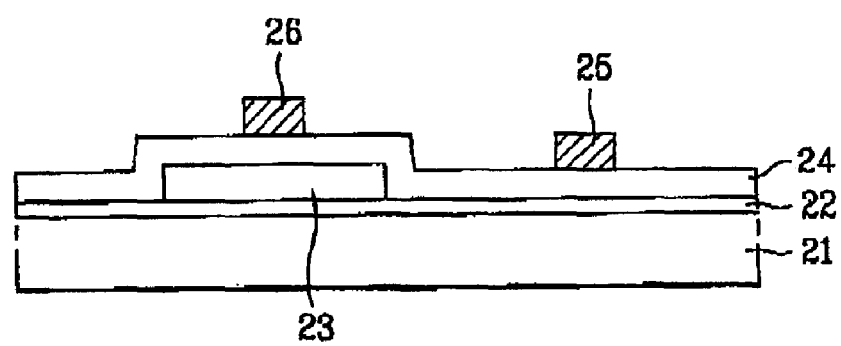
Figure 2C:
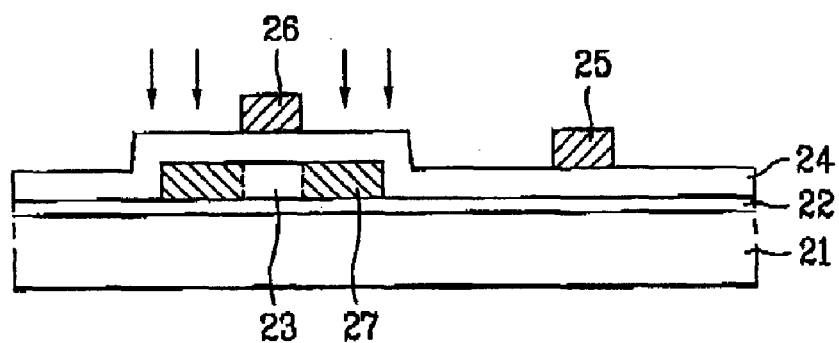
Figure 2D:
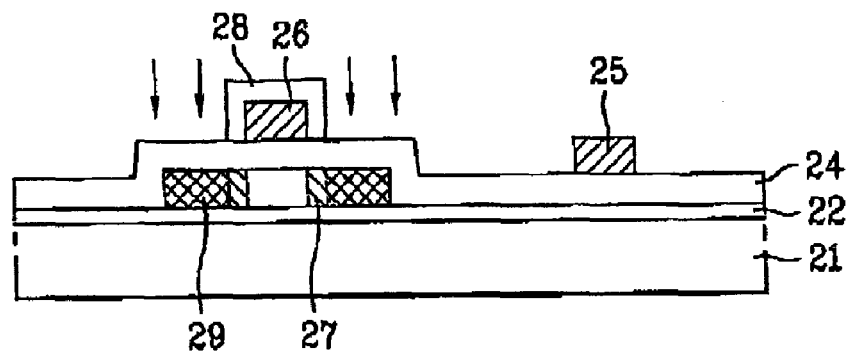
Figure 2E:
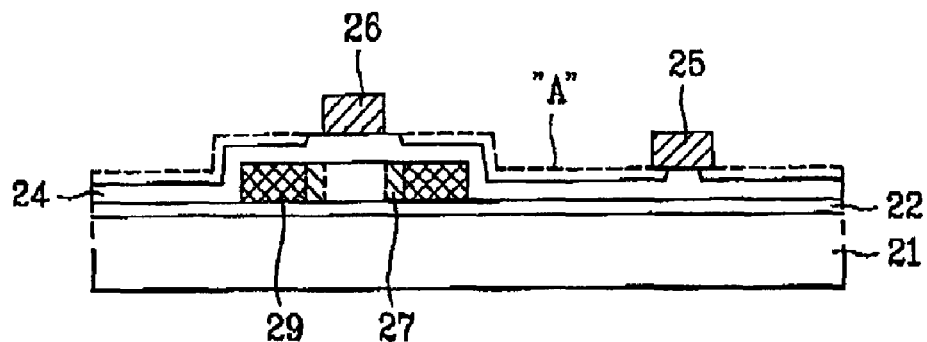
Figure 2F:
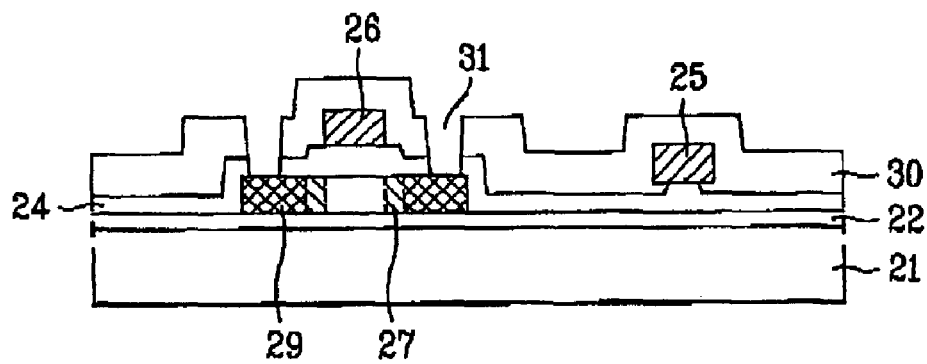
Figure 2G:
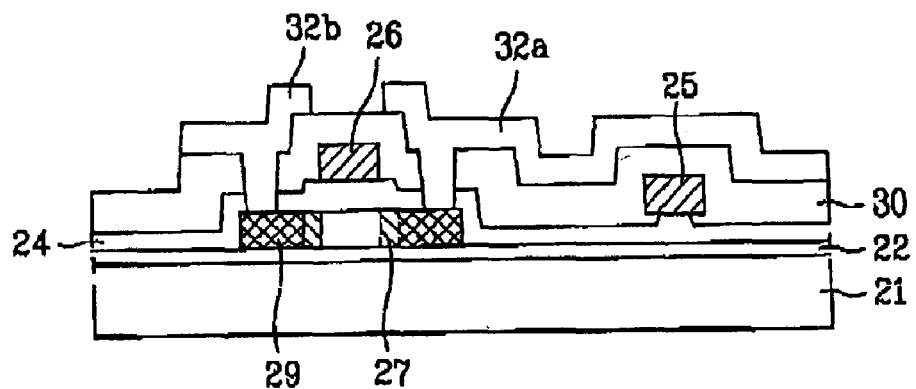
Figure 2H:
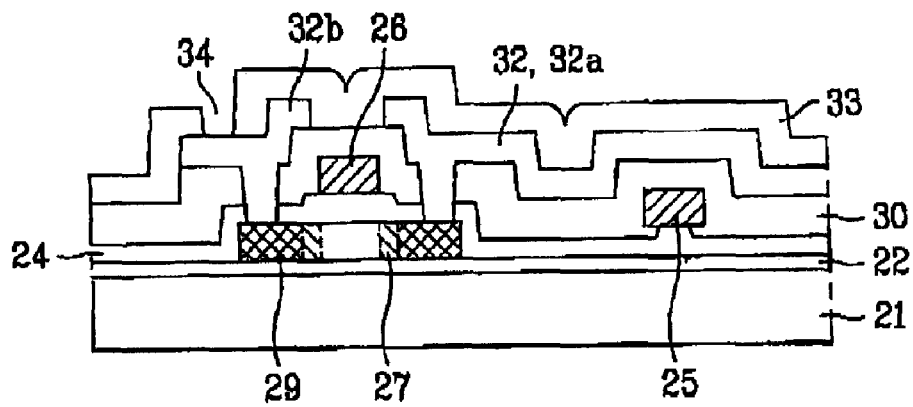
Figure 2I:
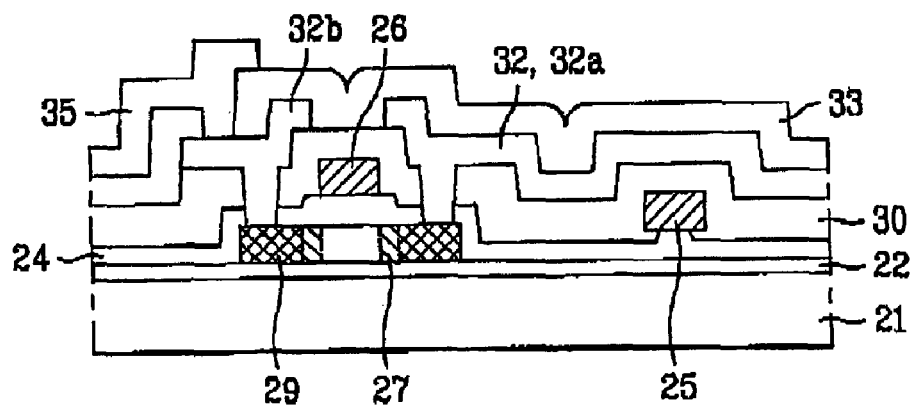
Figure 3:
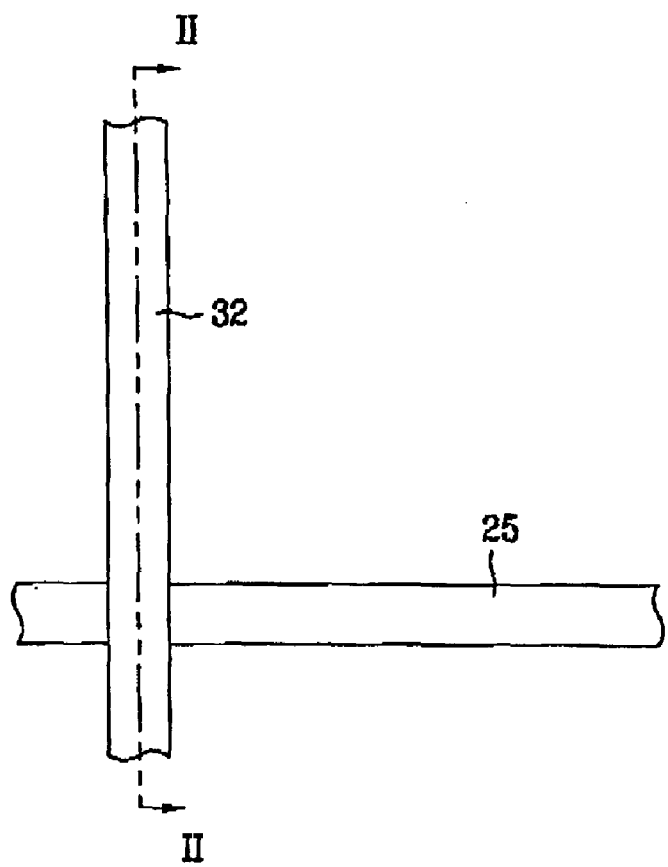
FIG. 3 is a plan view illustrating a state of forming a data line being in perpendicular to a gate line according to manufacturing process steps according to a related art.
Figure 4:
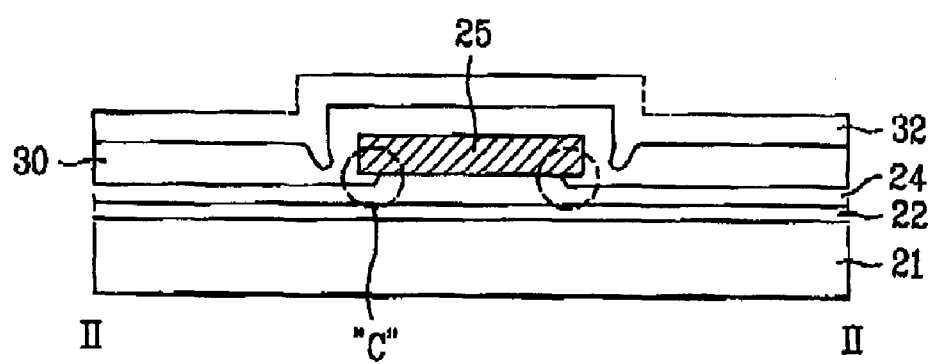
FIG. 4 is a cross-sectional view illustrating a related art LCD device taken along line II–II' of FIG. 3.
Figure 5A:
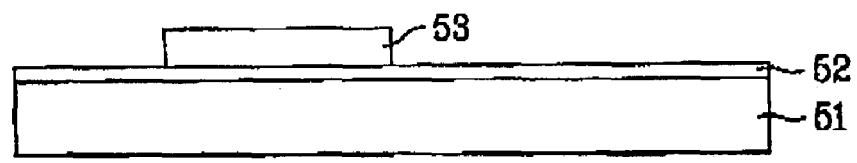
FIG. 5A to FIG. 5I are cross-sectional views illustrating manufacturing process steps of an LCD device taken along line I–I' of FIG. 1 according to an exemplary embodiment of the present invention.

FIG. 5A to FIG. 5I are cross-sectional views illustrating manufacturing process steps of an LCD device according to an exemplary embodiment of the present invention. Referring to FIG. 5A, a buffer layer 52 of a silicon oxide material is formed on an insulating layer or TFT array substrate 51. An amorphous silicon layer is then formed on the buffer layer 52. The amorphous silicon is deposited on the buffer layer 42 at a temperature between about 300° C. and about 400° C. by Plasma Enhanced CVD (PECVD), Low-Pressure CVD (LPCVD) using silane gas by sputtering, or other like methods. Subsequently, a laser irradiates the amorphous silicon layer to crystallize the amorphous silicon layer to form a polycrystalline-silicon layer. Next, the polycrystalline-silicon layer is selectively removed by photolithography such that an active layer 53 is formed.

In the alternative, other methods of recrystallization can be used. The methods for crystallizing amorphous silicon are generally classified into Excimer Laser Annealing (ELA), a Solid Phase Crystallization (SPC), and a Metal Induced Crystallization (MIC). In the ELA method, an excimer laser is irradiated to a substrate on which an amorphous silicon layer is deposited such that a polycrystalline-silicon layer is produced. In the SPC method, a heat treatment is performed on an amorphous silicon layer at a high temperature for a long time period to form a polycrystalline-silicon layer. In the MIC method, a metal is deposited on an amorphous silicon layer and heated to form a polycrystalline-silicon layer, which is suitable for a large-sized glass substrate.

Figure 5B:
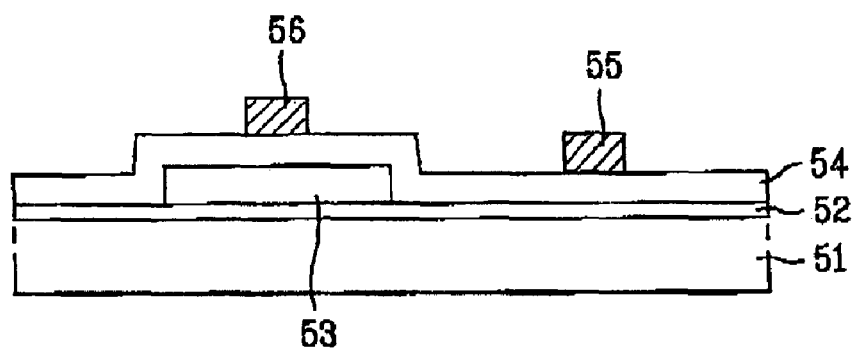
Figure 5C:
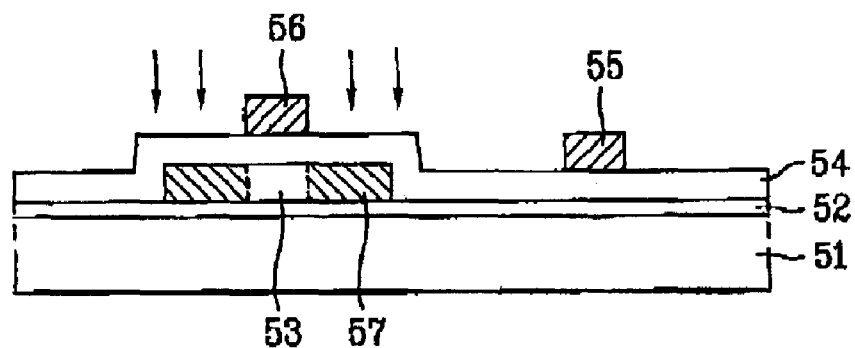

As shown in FIG. 5B, a silicon nitride layer is deposited over an entire surface of the insulating layer 51 including the active layer 53 to form a gate insulating layer 54. Then, a metal layer having a low resistance is formed on the gate insulating layer 54, and selectively removed by photolithography such that a plurality of gate lines 55 with protruding gate electrodes 56 are formed at fixed intervals. The gate insulating layer 54 can be formed by depositing an oxide silicon or a nitride silicon material using Chemical Vapor Deposition (CVD). The metal layer can be a sputtered conductive metal, such as aluminum Al, an aluminum alloy AlNd, Chrome Cr, tungsten W, or molybdenum Mo. Referring to FIG. 5C, lightly doped n-type or p-type impurity ions are selectively doped into the active layer 53 using the gate electrode 56 as a mask such that LDD regions 57 are formed in the active layer 53 on both sides of the gate electrode 56.

Figure 5D:
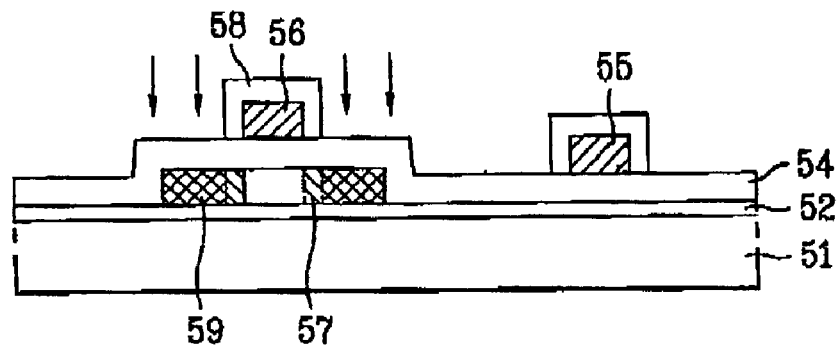

As shown in FIG. 5D, a photoresist layer 58 is deposited over the entire surface of the insulating layer 51, and then selectively patterned to surround the gate electrode 56 and the gate line 55 by photolithography. The gate line 55 on which the photoresist layer 58 is formed crosses under the data line that is subsequently formed. Then, n-type impurity ions or p-type impurity ions, depending on the conductivity type of the TFT, are selectively doped into active layer 53 with the patterned photoresist layer 58 used as a mask to form source and drain regions 59 in the active layer 53.

Figure 5E:
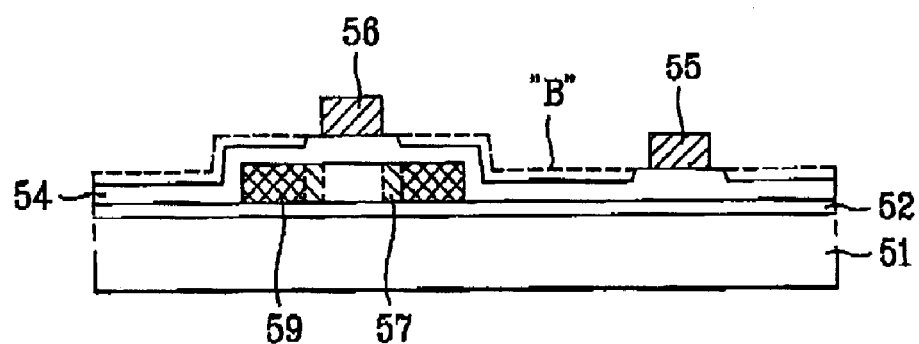
Figure 5F:
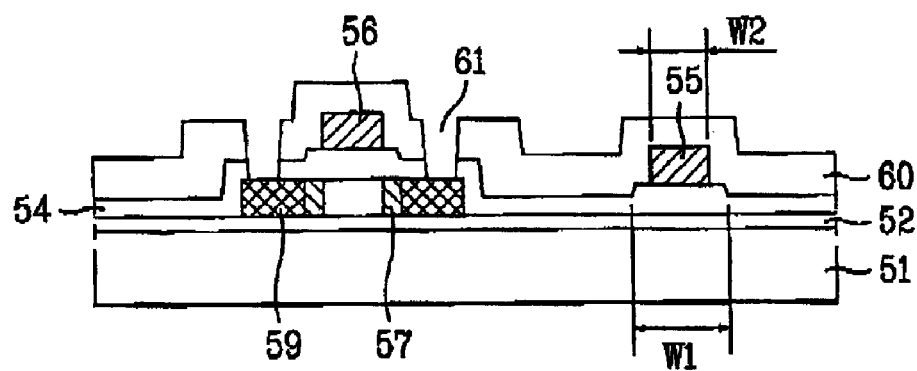

As shown in FIG. 5E, a surface of the photoresist layer 58 is changed during the processes of doping the highly doped impurity ions, such as a $PH_3+H_2$ plasma, $B_2H_6+H_2$ plasma or both for a CMOS process. More particularly, a surface portion of the photoresist layer 58 is hardened such that it is resistant to $O_2$ plasma etching. Thus, the harden portion of the photoresist layer 58 is removed with a $CF_4+O_2$ plasma etch. The portions of the gate insulating layer 54 under the photoresist layer 58, the gate electrode 56 and the gate line 55 are not exposed to the $CF_4+O_2$ plasma, thereby preventing those portions of the gate insulating layer 54 under the photoresist layer 58 from being etched. Accordingly, the gate line 55 is on a plateau of the gate insulating layer 54. More specifically, the width W1 of the plateau is greater than the width W2 of the gate line 55, as shown in FIG. 5F. The dotted line "B" shows the thickness of the gate insulating layer 54 removed when the hardened portion of the photoresist layer 58 was removed.

Referring to FIG. 5F, an annealing process is performed to the surface of the insulating layer 51 with thermal energy, such as laser, to activate respective ion regions in the active layer 53. Subsequently, an insulating interlayer 60 is formed on the entire surface of the insulating layer 51 including the gate electrode 56, and then the insulating interlayer 60 and the gate insulating layer 54 are selectively removed to expose upper surfaces of the source and drain regions 59 to thereby form first contact holes 61. The insulating interlayer 60 is formed of an inorganic insulating material, such as a silicon nitride or silicon oxide, or an organic insulating material having a low dielectric constant, such as an acrylic organic compound, Teflon, BCB, cytop, or PFCB.

Figure 5G:
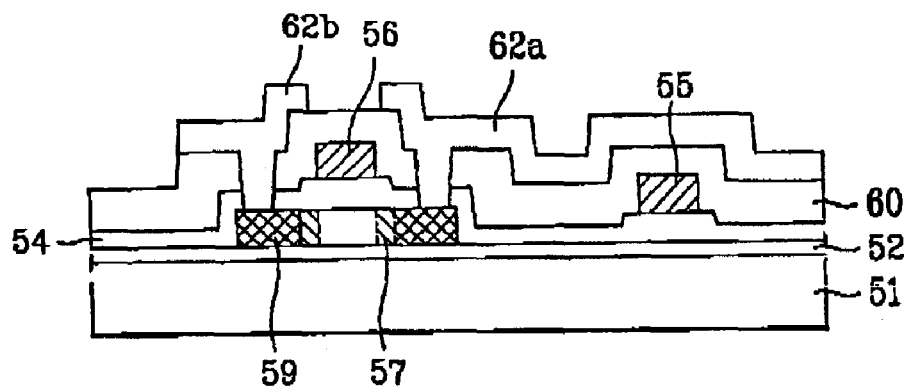

As shown in FIG. 5G, a metal layer is deposited over the entire surface of the insulating layer 51 including the first contact holes 61 in FIG. 5F. Then, the data line 62 crossing over the gate line 55 and the drain electrode connected to the source and drain regions 59, respectively, are formed by photolithography. The metal layer is formed by sputtering a metal material, such as aluminum Al, copper Cu, tungsten W, chrome Cr, or molybdenum Mo, or an molybdenum alloy, such as MoW, MoTa, or MoNb, by CVD or sputtering.

Figure 5H:
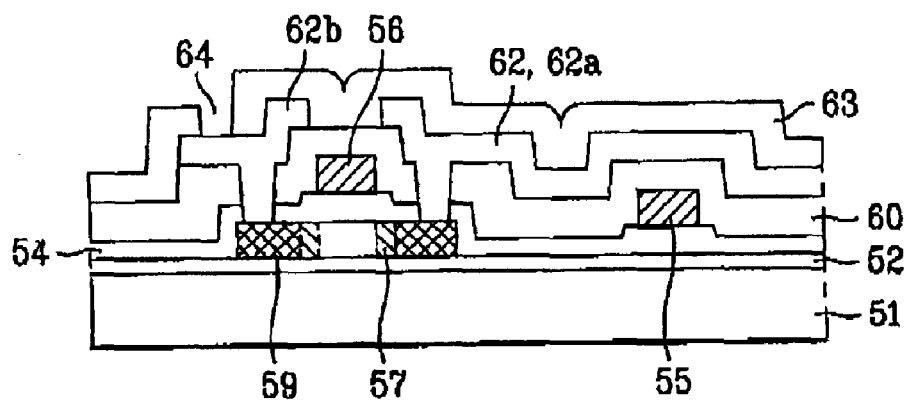
Figure 5I:
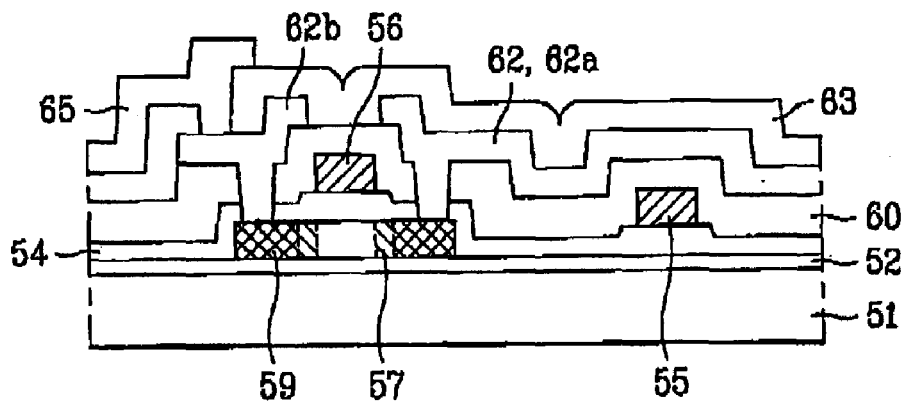

Referring to FIG. 5H, a passivation layer 63 is formed over the entire surface of the insulating layer 51 including the source electrode 62a and the drain electrode 62b. A portion of the passivation layer 63 is selectively removed to expose a predetermined portion of the drain electrode 62b to thereby form a second contact hole 64. The passivation layer 63 is formed of a silicon nitride, a silicon oxide, BCB, or an acrylic resin. As shown in FIG. 5I, a metal layer is deposited on the entire surface of the insulating layer 51 including the second contact hole 64 in FIG. 5H, and then selectively patterned to form a pixel electrode 65 connected to the drain electrode 62b through the second contact hole 64 in FIG. 5H. The metal layer is formed of indium-tin-oxide (ITO), indium-zinc-oxide (IZO), indium-tin-zinc-oxide (ITZO), Al, AlNd, Cr, or Mo by CVD or sputtering. Although not shown, a color filter substrate having a color filter layer and a common electrode is bonded to the TFT array substrate, and then a liquid crystal layer is formed between the TFT array substrate and the color filter substrate.

Figure 6:
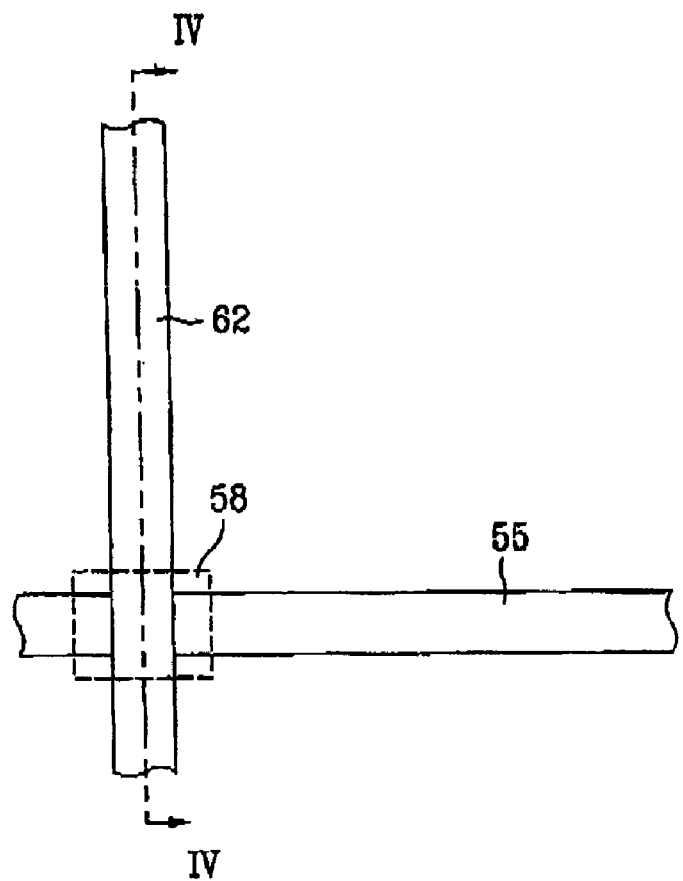
FIG. 6 is a plan view illustrating a data line being in perpendicular to a gate line according to manufacturing process steps according exemplary embodiment of the present invention.
Figure 7:
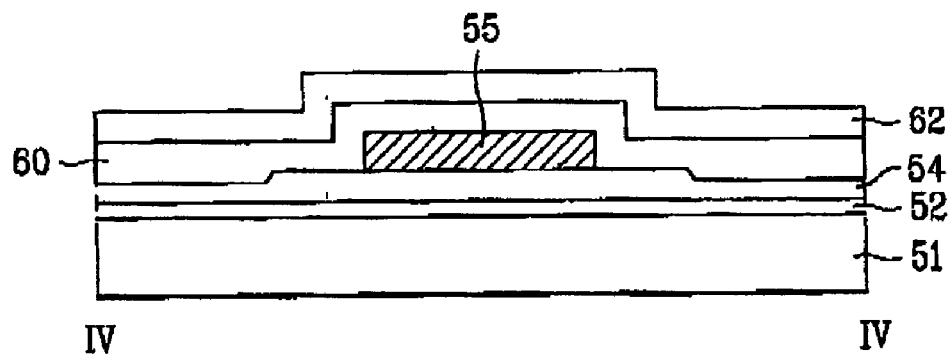

FIG. 6 is a plan view illustrating a data line being in perpendicular to a gate line according to manufacturing process steps according to the exemplary embodiment of the present invention. FIG. 7 is a cross-sectional view illustrating an LCD device taken along line IV–IV' of FIG. 6. Referring to FIG. 6 and FIG. 7, the photoresist layer 58 of FIG. 5D is formed on the gate line 55 crossing over data line 62. Thus, it is possible to prevent the gate insulating layer 54 below the gate line 55 from being etched when the photoresist layer 58 is removed as described with regard to FIG. 5E.

Figure 8A:
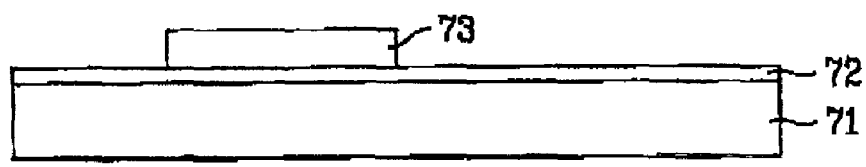
FIG. 8A to FIG. 8H are cross-sectional views illustrating manufacturing process steps of an LCD device according to another exemplary embodiment of the present invention.

FIG. 8A to FIG. 8H are cross-sectional views illustrating manufacturing process steps of an LCD device according to another exemplary embodiment of the present invention. Referring to FIG. 8A, a buffer layer 72 of a silicon oxide material is formed on an insulating layer (TFT array substrate) 71, and an amorphous silicon layer is formed over the buffer layer 72. An amorphous silicon is deposited on the buffer layer 42 at a temperature between about 300° C. and about 400° C. by Plasma Enhanced CVD (PECVD), Low-Pressure CVD (LPCVD) using silane gas, or by sputtering. Subsequently, a laser irradiates amorphous silicon layer to crystallize the amorphous silicon layer into a polycrystalline silicon layer. Then, the polycrystalline silicon layer is selectively removed by photolithography such that an active layer 73 is formed.

Figure 8B:
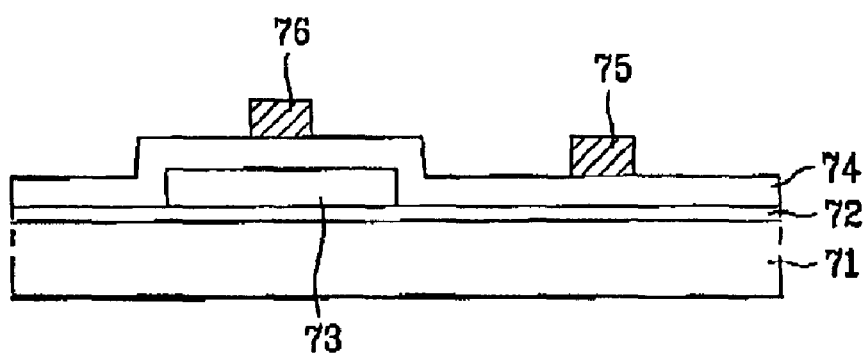

As shown in FIG. 8B, a gate insulating layer 74 is formed over the surface of the insulating layer 71 including the active layer 73. Then, a metal layer having a low resistance is formed on the gate insulating layer 74, and then selectively removed by photolithography to thereby form a plurality of gate lines 75 with protruding gate electrodes 76 in one direction at fixed intervals. The gate insulating layer 74 can be formed by depositing silicon oxide or silicon nitride by Chemical Vapor Deposition (CVD). The metal layer can be formed by sputtering a conductive material, such as aluminum Al, an aluminum alloy AlNd, chrome Cr, tungsten W, or Molybdenum Mo.

Figure 8C:
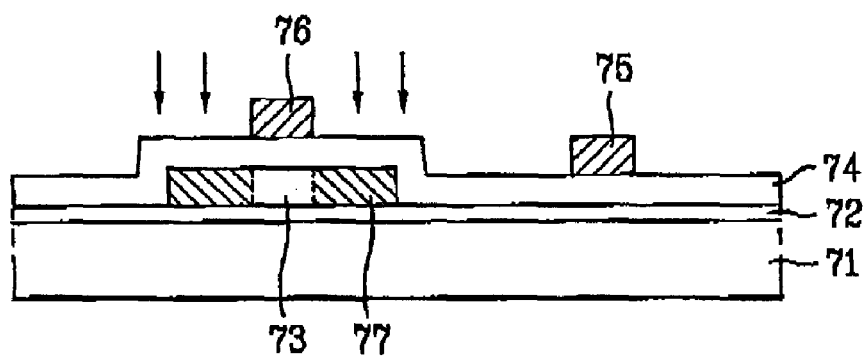
Figure 8D:
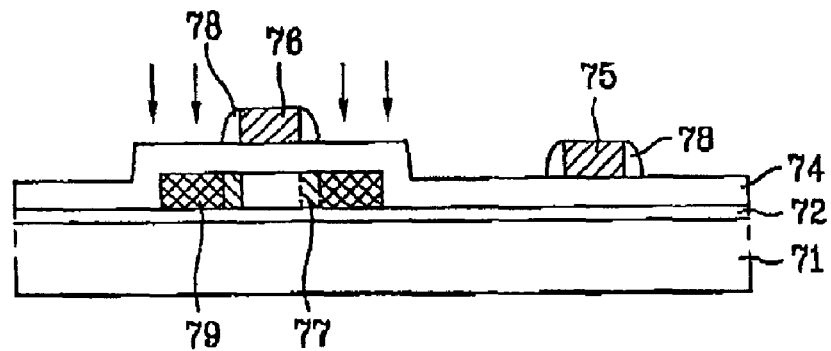

As shown in FIG. 8C, lightly doped n-type or p-type impurity ions are selectively doped into the active layer 73 with the gate electrode 76 used as a mask such that LDD regions 77 are formed in the active layer 73 on both sides of the gate electrode 76. Referring to FIG. 8D, an insulating layer is formed over the surface of the insulating layer 71 including the gate electrode 76, and then sidewall spacers 78 are respectively formed at both sides of the gate electrode 76 and the gate line 75. Subsequently, highly doped p-type or n-type impurity ions are selectively doped into the active layer 73 using the gate electrode 76 and the sidewall spacers 78 as masks such that source and drain regions 79 are formed in the active layer 73.

Figure 8E:
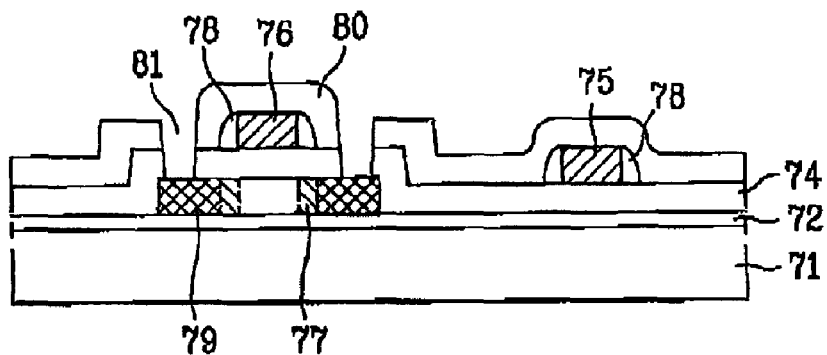

As shown in FIG. 8E, an annealing process is performed on the active layer 73 with a thermal energy, such as a laser, to activate respective ion regions formed in the active layer 73. Afterwards, an insulating interlayer 80 is formed on the entire surface of the insulating layer 71 including the gate electrode 76, and then the insulating interlayer 80 and the gate insulating layer 74 are selectively removed to expose upper surfaces of the source and drain regions 79 to thereby form first contact holes 81. The insulating interlayer 80 can be formed of an inorganic insulating material, such as a silicon nitride or an silicon oxide, or an organic insulating material having a low dielectric constant, such as an acrylic organic compound, Teflon, BCB, cytop, or PFCB.

Figure 8F:
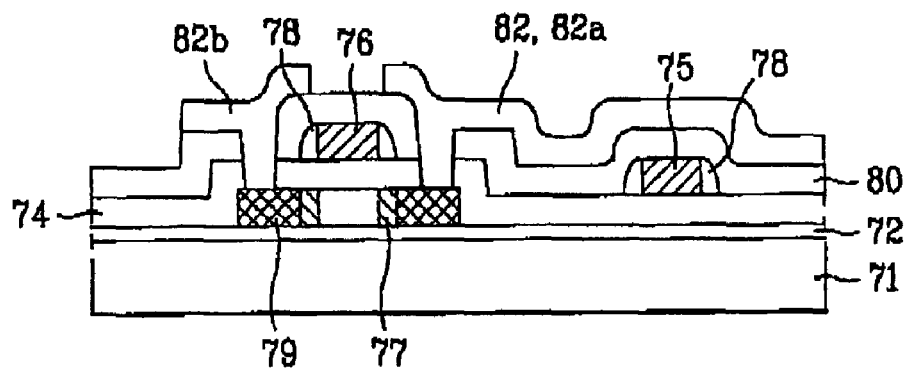

As shown in FIG. 8F, a metal layer is deposited over the entire surface of the insulating layer 71 including the first contact holes 81. Then, a data line 82 crossing over the gate line 75 and the drain electrode 82b connected to the source and drain regions 79, respectively, are formed by photolithography. The metal layer is formed of a metal material, such as aluminum Al, copper Cu, tungsten W, chrome Cr, molybdenum Mo, titanium Ti, or tantalum Ta, or an Mo alloy, such as MoW, MoTa, or MoNb. Thus, the source electrode 82a or data line 82 crosses directly over a portion of the gate line 75 along a pixel area boundary in which the portion of the gate line 75 has sidewall spacers 78.

Figure 8G:
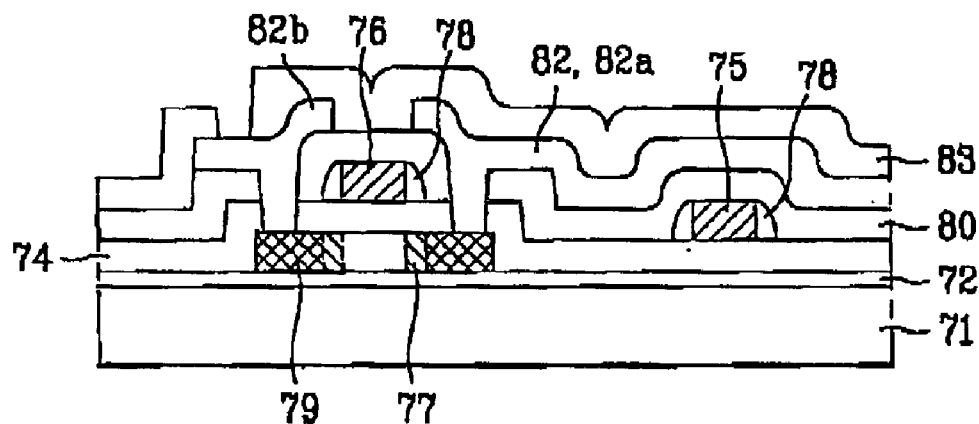

Referring to FIG. 8G, a passivation layer 83 is formed over the surface of the insulating layer 71 including the source and drain electrodes 82a and 82b, and then selectively removed to expose a predetermined portion of the drain electrode 82b to form a second contact hole 84. The passivation layer 83 can be formed of silicon nitride, silicon oxide, BCB, or an acrylic resin.

Figure 8H:
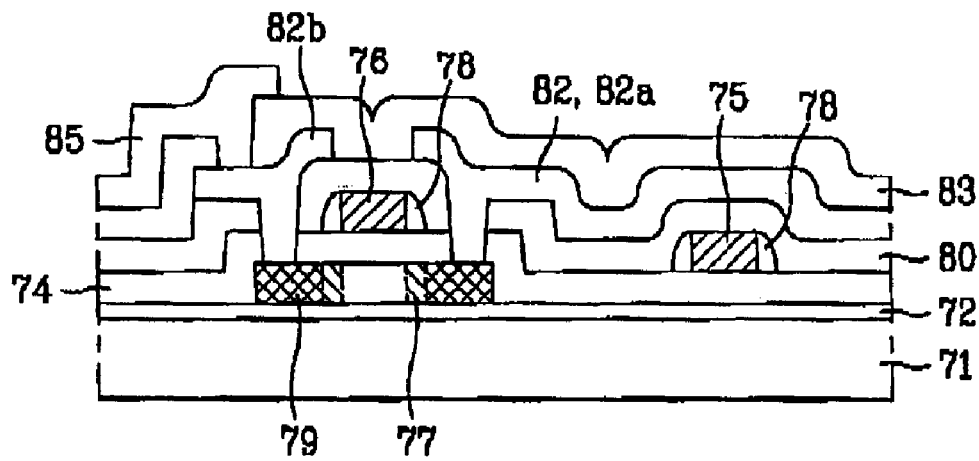

As shown in FIG. 8H, a metal layer is deposited on the entire surface of the insulating layer 71 including the second contact hole 84, and then selectively patterned to form a pixel electrode 85 connected to the drain electrode 82b through the second contact hole 84. The metal layer is formed of indium-tin-oxide (ITO), indium-zinc-oxide (IZO), indium-tin-zinc-oxide (ITZO), Al, AlNd, Cr, or Mo by CVD or sputtering.

The preferred embodiments of the present invention describe processes of forming a NMOS transistor or a PMOS transistor. However, when forming a CMOS transistor by repetitively performing a photoresist layer deposition and removing process, the photoresist layer is formed on the gate line crossing the data line, and then removed. Thus, it is possible to prevent both sides of the gate line and the gate insulating layer below the gate line from being etched, thereby preventing a disconnection of the data line by a failure of a step coverage.

Accordingly, when doping the impurity ions to form the source and drain regions, the photoresist layer is formed on the gate line crossing to the data line it is possible to prevent the gate insulating layer below the gate line from being etched when removing the photoresist layer to thereby prevent a disconnection of the data line by poor step coverage in an interlayer insulator that is subsequently formed on the gate insulating layer. Also, the impurity ions are doped to form the source and drain regions after forming the sidewall spacers at both sides of the gate electrode and the gate line, so that the process steps for depositing and completely removing the photoresist layer may be omitted to thereby improve the step coverage and manufacturing margin.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for manufacturing an LCD device having gate and data lines, comprising:

forming an active layer on an insulating substrate;

forming a gate insulating layer over a surface of the insulating substrate including the active layer;

forming a gate line and a gate electrode on the gate insulating layer, so that the gate electrode is positioned above the active layer;

forming a photoresist pattern on the gate electrode and on the gate line where the gate and the data lines cross each other, wherein the photoresist pattern surrounds the gate electrode and the gate line;

forming source and drain regions in the active layer by injecting impurity ions into the active layer using the photoresist pattern as a mask;

removing the photoresist pattern;

forming an insulating interlayer over the entire surface of the insulating substrate, the insulating interlayer having first contact holes exposing predetermined portions of the source and drain regions;

forming a data line electrically connected to the source region and crossing over the gate line on the insulating interlayer;

forming a drain electrode;

forming a passivation layer over the surface of the insulating substrate, the passivation layer having a second contact hole exposing a predetermined portion of the drain electrode; and forming a pixel electrode to electrically connect to the drain region through the second contact hole.

2. The method of claim 1, further comprising a step of forming LDD regions in the active layer on both sides of the gate electrode by injecting lightly doped impurity ions into the active layer using the gate electrode as a mask.

3. The method of claim 1, wherein the step of forming the active layer further comprises:

forming an amorphous silicon layer on the insulating substrate;

forming a polycrystalline silicon layer by applying energy to the amorphous silicon layer; and selectively removing the polycrystalline silicon layer.

4. The method of claim 3, further comprising a step of forming a buffer layer between the insulating substrate and the amorphous silicon layer.

5. The method of claim 1, wherein the insulating interlayer is formed of silicon nitride, silicon oxide, an acrylic organic compound, Teflon, BCB, cytop and PFCB.

6. The method of claim 1, wherein the gate electrode is formed of aluminum, aluminum alloy, chrome, tungsten, or molybdenum.

7. The method of claim 1, wherein the pixel electrode is formed of ITO, IZO, ITZO, Al, AlNd, Cr, or Mo.

8. The method of claim 1, wherein the passivation layer is formed of silicon nitride, silicon oxide, BCB, or acrylic resin.

9. A method for manufacturing an LCD device, comprising:

forming an active layer on an insulating layer;

forming a gate insulating layer over a surface of the insulating substrate including the active layer;

forming a gate line and a gate electrode on the gate insulating layer so that the gate electrode is positioned above the active layer and is connected to the gate line;

forming sidewall spacers at both sides of the gate electrode and the gate line;

forming source and drain regions in the active layer by injecting impurity ions into the active layer using the gate electrode and the sidewall spacers as a mask;

forming an insulating interlayer over the surface of the insulating substrate, wherein the insulating interlayer has first contact holes exposing predetermined portions of the source and drain regions;

forming a data line electrically connected to the source region and crossing over the gate line on the insulating interlayer;

forming a drain electrode;

forming a passivation layer over the surface of the insulating substrate, wherein the passivation layer has a second contact hole exposing a predetermined portion of the drain electrode; and forming a pixel electrode to electrically connect to the drain electrode through the second contact hole.

10. The method of claim 9, wherein the step of forming the active layer further comprises:

forming an amorphous silicon layer above the insulating substrate;

forming a polycrystalline silicon layer by irradiating a laser onto the amorphous silicon layer; and selectively removing the polycrystalline silicon layer.

11. The method of claim 10, further comprising a step of forming a buffer layer between the insulating substrate and the amorphous silicon layer.

12. The method of claim 9, wherein the insulating interlayer is formed of silicon nitride, silicon oxide, acrylic organic compound, Teflon, BCB, cytop, or PFCB.

13. The method of claim 9, wherein the gate electrode is formed aluminum, aluminum alloy, chrome, tungsten, or molybdenum.

14. The method of claim 9, wherein the pixel electrode is formed of ITO, IZO, ITZO, Al, AlNd, Cr, or Mo.

15. The method of claim 9, wherein the passivation layer is formed of silicon nitride, silicon oxide, BCB, or acrylic resin.

16. An LCD device, comprising:

an active layer on an insulating layer;

a gate insulating layer formed over a surface of the insulating substrate including the active layer;

a gate line and a gate electrode formed on the gate insulating layer so that the gate electrode is positioned above the active layer;

sidewall spacers formed at both sides of the gate electrode and the gate line;

source and drain regions formed in the active layer by injecting impurity ions into the active layer using the gate electrode and the sidewall spacers as a mask;

an insulating interlayer formed over the surface of the insulating substrate, wherein the insulating interlayer has first contact holes exposing predetermined portions of the source and drain regions;

drain electrode connected to the drain region;

a data line connected to the source region and crossing directly over a portion of the gate line along a pixel area boundary in which the portion of the gate line has the sidewall spacers;

a passivation layer formed over the surface of the insulating substrate, wherein the passivation layer has a second contact hole exposing a predetermined portion of the drain electrode; and a pixel electrode electrically contacting the drain electrode through the second contact hole.

17. The LCD device of claim 16, wherein the active layer is a polycrystalline silicon layer.

18. The LCD device of claim 16, further comprising a buffer layer between the insulating substrate and the active layer.

19. An LCD device, comprising:

an active layer on an insulating layer;

a gate insulating layer formed over a surface of the insulating substrate including the active layer;

a gate line and a gate electrode formed on the gate insulating layer so that the gate electrode is positioned above the active layer;

source and drain regions formed in the active layer by injecting impurity ions into the active layer using the gate electrode as a mask;

an insulating interlayer formed over the surface of the insulating substrate, wherein the insulating interlayer has first contact holes exposing predetermined portions of the source and drain regions;

drain electrode connected to the drain region;

a data line connected to the source region and crossing directly over a portion of the gate line along a pixel area boundary in which the portion of the gate line is on plateau of the gate insulating layer;

a passivation layer formed over the surface of the insulating substrate, wherein the passivation layer has a second contact hole exposing a predetermined portion of the drain electrode; and a pixel electrode electrically contacting the drain electrode through the second contact hole.

20. The LCD device of claim 19, wherein a width of the plateau is greater than a width of the gate line.

21. The method of claim 1, further comprising a step of selectively removing the gate insulating layer simultaneous with the step of removing the photoresist pattern.

22. The method of claim 1, wherein the gate line is formed on a plateau of the gate insulating layer.

23. The method of claim 22, wherein a width of the plateau is greater than a width of the gate line.

* * * * *